March 9, 1926.

R. M. WARNER

ACIDPROOF CONTAINER

Filed July 14, 1925

1,575,666

Inventor:
Raymond M. Warner,
by Spear Middleton Donaldson & Hall
Attys.

Patented Mar. 9, 1926.

1,575,666

UNITED STATES PATENT OFFICE.

RAYMOND M. WARNER, OF AKRON, OHIO, ASSIGNOR TO THE MILLER RUBBER COMPANY, OF AKRON, OHIO, A CORPORATION OF OHIO.

ACID-PROOF CONTAINER.

Application filed July 14, 1925. Serial No. 43,528.

*To all whom it may concern:*

Be it known that I, RAYMOND M. WARNER, citizen of the United States, and resident of Akron, in the county of Summit and State of Ohio, have invented certain new and useful Improvements in Acid-Proof Containers, of which the following is a specification.

My present invention relates to improvements in acid-proof containers of the cylindrical portable type, and aims to provide for the economical manufacture of a metal container having a rubber lining which will be firmly secured thereto and prevented from sagging away from the walls of the container, and the invention includes the novel article hereinafter described and defined by the appended claims.

In order that the invention may be better understood, reference is made to the accompanying drawing, in which:—

Figure 1:
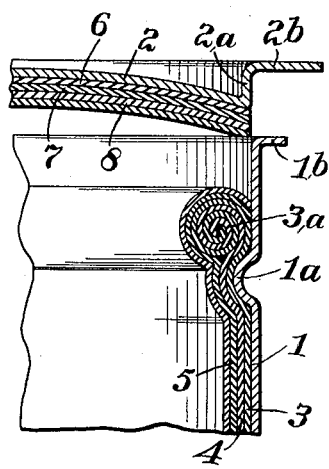
Figure 1 is a sectional view of a container at one stage of the manufacture.
Figure 2:
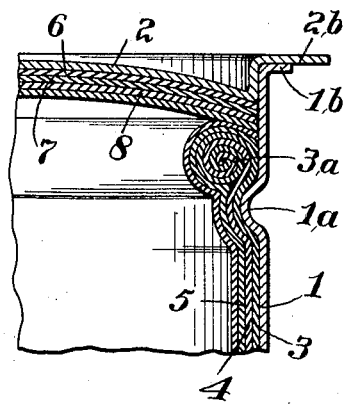
Fig. 2 is a similar view at another stage.
Figure 3:
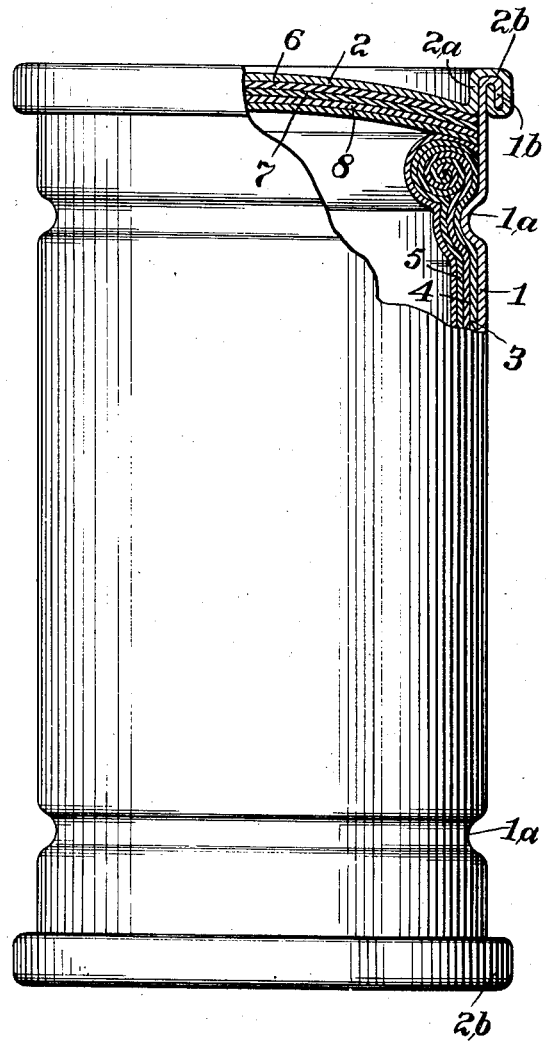
Fig. 3 is a similar view of the completed drum or container.

In proceeding according to my invention, I provide a cylindrical sheet metal drum body 1 open at both ends and provided adjacent to, but spaced from its ends with internal annular shoulders 1$^a$ which may be conveniently formed by rolling channels in the exterior surface of the drum, or in an analogous manner. The ends are preferably provided with outwardly turned flanges 1$^b$ designed for head securing purposes, as hereinafter described.

The heads are indicated at 2 and are provided with cylindrical portions 2$^a$ designed to fit within the ends of the body portion and with outwardly turned flanges 2$^b$ designed to cooperate with the flanges 1$^b$.

Given such a container body and heads in their unassembled condition, the interior surfaces are thoroughly cleaned preferably by sand blasting, whereon they may be given a coat of rubber cement which is vulcanized thereon in a suitable manner, as by means of sulphur chloride. Thereafter I apply to the interior surface of the drum body one or more layers of vulcanizable compound preferably using two layers, indicated respectively at 3 and 4, and in the event that two layers are used, the inner of these layers 4, is preferably formed of a compound which will only partially cure at the temperature which is required to completely cure the layer 3. This lining layer or layers, of vulcanizable rubber, extends sufficiently beyond the shoulders 1$^a$ to enable the projecting portion to be rolled upon itself in the form of, or to produce beads which overlie and are juxtaposed to the shoulders 1$^a$, such beads being indicated at 3$^a$. Thereafter I apply to the inner surface of the lining layer or layers, a lining of unvulcanizable rubber compound indicated at 5, which is preferably of laminated form, that is composed of two superposed sheets of unvulcanizable material, that is material which will remain unvulcanized when subjected to the temperature which completely vulcanizes the layer 3 and partially vulcanizes the layer 4.

The unvulcanizable lining is carried up around and over the outer surfaces of the beads as shown. In a similar manner the heads are lined with vulcanizable and unvulcanizable layers, preferably in the same manner, to wit, a completely vulcanizable head layer 6, a partially vulcanizable juxtaposed layer 7, and a laminated unvulcanizable layer 8.

After the lining layers have been applied as above described, the container parts are subjected to the necessary vulcanizing temperature, preferably in a dry heat oven, and the end closure members are then applied to the container body with the margins of the unvulcanized lining 8 pressed against the unvulcanized bead coverings. One or both of the contacting unvulcanized rubber parts may be moistened or softened with a rubber solvent such as gasoline, to secure a more intimate union.

After the heads have been applied they may be secured in any suitable manner, as for example by rolling together the flanges 1$^b$ and 2$^b$.

Having thus described my invention, what I claim is:—

1. A portable cylindrical acid-proof container comprising a cylindrical body having internal annular shoulders adjacent the ends thereof, said body and said heads having rubber linings, the edges of the body lining being rolled to form annular beads overlying the shoulders, and said heads being secured to the body with the margins of the linings thereof pressed against the beads.

2. The container of claim 1, in which the body lining is composed of layers of vulcanized and unvulcanized rubber respectively, the edges of the vulcanized layers being rolled to form beads, and the edges of the unvulcanized layer overlying the beads, and in which the heads have an unvulcanized surface layer in contact with the unvulcanized bead coverings.

In testimony whereof I affix my signature.

RAYMOND M. WARNER.